United States Patent [19]

Yoneda

[11] Patent Number: 5,077,150
[45] Date of Patent: Dec. 31, 1991

[54] CELL AND METHOD OF PRODUCING THE SAME

[75] Inventor: Tetsuya Yoneda, Nara, Japan

[73] Assignee: Sharp Kabushiki Kaisha, Osaka, Japan

[21] Appl. No.: 610,761

[22] Filed: Nov. 8, 1990

Related U.S. Application Data

[63] Continuation-in-part of Ser. No. 346,452, May 2, 1989.

[30] Foreign Application Priority Data

May 2, 1988 [JP] Japan ................................. 63-109432

[51] Int. Cl.$^5$ ............................................. H01M 10/28
[52] U.S. Cl. ..................................... 429/162; 429/251; 29/623.1
[58] Field of Search ............... 429/162, 129, 132, 133, 429/66, 164, 251, 252; 29/623.1

[56] References Cited

U.S. PATENT DOCUMENTS 4,548,880 10/1985 Suzuki et al. .................. 429/162
4,782,584 11/1988 Mohri et al. .................. 29/623.1

Primary Examiner—Donald L. Walton
Attorney, Agent, or Firm—Birch, Stewart, Kolasch & Birch

[57] ABSTRACT

A cell having a cell and a method of producing a cell element which includes a positive electrode and a negative electrode with a separator sandwiched therebetween and an electrolyte absorbed in the cell element is, characterized in that the separator in the cell is composed of a mixture of a binder the volume of which can be increased with the penetration of the electrolyte and an insulating support having an insulating property, the mixture being penetrated with the electrolyte, wherein the separator is so designed as to have a larger size than the outer periphery of the positive electrode and/or the negative electrode.

16 Claims, 2 Drawing Sheets

5,077,150

CELL AND METHOD OF PRODUCING THE SAME

This application is a continuation-in-part of copending application Ser. No. 07/346,452 filed on May 2, 1989, the entire contents of which are hereby incorporated by reference.

BACKGROUND OF THE INVENTION

1. Field of the Invention

The present invention relates to a cell and, more particularly, to the improvement of the separator of a cell which uses an electrolyte.

2. Description of the Prior Art

As the typical method of producing a coin-shaped cell which uses a tubular three-layered cell element, a method is known which consists of the steps of: placing a mixture for separator between a powder mixture for positive electrode which contains a positive active material and a powder mixture for negative electrode which contains a negative active material, molding them under pressure to obtain a tabular three-layered cell element consisting of a positive electrode/ a separator/ a negative electrode, putting the cell element into a coin-shaped container with a collector welded thereto, supplying an electrolyte in the cell element and then sealing the container (U.S. Pat. No. 4,782,548). In this case, when the electrolyte is supplied to the tabular three-layered cell element, the positive electrode, the separator and the negative electrode exhibit a volume increase of substantially the same degree.

Such a conventional method of producing a cell, however, is disadvantageous in that when three-layered tablets are continuously manufactured by the same die, a stain of the die adheres to the outer periphery of the three-layered tablet, which is apt to cause short circuit, and in that when short circuit is generated, the supply of the electrolyte causes internal short circuit, which leads to the drop of voltage and reduction in capacity. To prevent such trouble, it is necessary to frequently clean the die.

The present invention has been made in order to eliminate the above-described problems in the prior art.

SUMMARY OF THE INVENTION

The present invention provides a cell having a cell element comprising a positive electrode, a negative electrode, a separator sandwiched between the positive and negative electrodes and an electrolyte, the separator being composed of a mixture of a binder which can absorb the electrolyte and can swell and an insulating support, penetrated by the electrolyte and so designed as to have a larger size than the outer periphery of the positive electrode and/or the negative electrode.

In another aspect, the present invention provides a method of producing the above mentioned cell.

The separator in the cell element of the present invention comprises a separator having a sufficient external shape for preventing short circuit between the positive electrode and the negative electrode, and especially serving to prevent short circuit between the positive electrode and the negative electrode which is inevitably caused in the assembly of the cell by self expanding when a separator is penetrated by an electrolyte.

DESCRIPTION OF THE PREFERRED EMBODIMENTS

Figure 1:
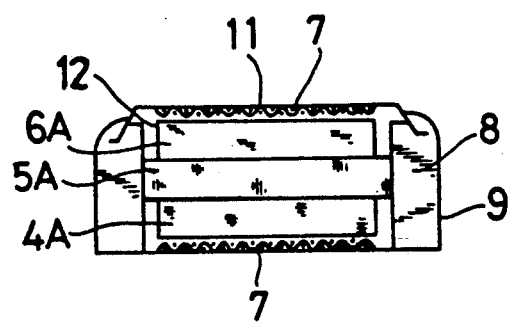
FIG. 1 is an explanatory view of an embodiment of a cell according to the present invention.

The separator in the present invention is located between the positive electrode and the negative electrode which are laminated and is so composed as to have a larger size than the outer periphery of the positive electrode. and/or the negative electrode.

"To have a larger size" means that the separator is so composed as to have a substantially larger outer periphery than the outer periphery of the positive electrode and/or the negative electrode in order to prevent short circuit at the outer peripheral portion of the positive electrode and/or the negative electrode. The configuration of the positive electrode and the negative electrode is not limited but is preferably a thin cylinder. As to the size, they are preferably, for example, about 5 to 20 mm in diameter. The size of the separator is appropriately determined in accordance with the above-described aim, and is preferably about 0.3 to 2.5 mm larger than the outer periphery of the positive electrode and/or the negative electrode.

The cell element having the separator having a larger size as described above can be produced by utilizing the difference in the volume increase, especially, in the widthwise direction, among the positive electrode, the negative electrode and the separator caused by the penetration of the electrolyte, when the electrolyte is supplied after the pressure molding of the positive electrode, the negative electrode and the separator by the same die into the same size.

Thus the separator is produced by using a binder which can absorb the electrolyte and can swell in volume, and an insulating support.

The electrolyte may be either aqueous or non-aqueous, and by increasing or reducing the amount of electrolyte added, it is possible to increase or reduce the increment of the volume of the binder and, hence, to control the degree at which the outer periphery of the separator protrudes from the outer periphery of the positive electrode and/or the negative electrode.

The "binder" to be used for the formation of the separator means a binder which can absorb the electrolyte and can itself swell and which is not chemically changed by the electrolyte.

In the case of using an aqueous electrolyte, examples of the binders are methyl celluloses, carboxymethyl celluloses, an agar-agar, a starch, starches grafted by acrylic or methacrylic acid, hydrolyzed acrylate (or methacrylate)-vinyl acetate copolymers, polyvinyl alcohol, crosslinked polyvinyl alcohols, crosslinked polyacrylic (or polymethacrylic) acids and salts thereof.

In the case of a non-aqueous electrolyte, examples of the binders are nitro cellulose and polyvinyl acetate.

These binders are generally used in the form of a powder or fibers. As a fibrous binder, carboxymethyl cellulose or methyl cellulose in the form of short fibers is suitable.

Since such a fibrous binder can provide the separator with a property of extending in one-dimensional direction as well as a property of expanding in three-dimensional directions, it enables advantageous protrusion of the outer periphery of the separator.

The "insulating support" is preferably capable of supporting the electrolyte as the necessary conditions and inert in the electrolyte. Examples of the insulating supports are silicon oxide and aluminum oxide. The support is generally used in the form of a powder.

The ratio of the binder and the insulating support is ordinarily 1:1 to 1:4 by weight, preferably 1:2 to 1:4, particularly preferably 1:2.5 to 1:4. If the binder is less than this range, the expansion of the separator is unfavorably insufficient. If the binder is more than this range, the separator becomes prone to be damaged by shock or vibration if the cell falls, and thus short-circuit may occur in the obtained cell.

A cell comprising a positive electrode, a negative electrode and a separator all of which are composed of a compressed powder molded product will be cited in the following. Both the positive electrode and the negative electrode are not restricted to a pressure molded product but the present invention is widely applicable to a cell incorporating sintered electrodes, paste electrodes, metal electrodes or solid electrodes as either the positive electrode or the negative electrode.

The positive electrode is composed of a powder mixture for positive electrode, which includes a positive active material, a conductive material and a binder for positive electrode. Examples of the positive active materials are oxidizing agents such as manganese dioxide, nickel oxide, tungsten trioxide, lead dioxide, and molybdenum trioxide and a mixture thereof. Among these, manganese dioxide and nickel oxide are preferable. The "conductive material" is an electron conductive material which is added to secure the electron conductivity. Examples of the conductive materials are acetylene black, graphite, carbon black and a nickel powder. Among these, acetylene black and graphite are preferable. The "binder for positive electrode" is a material added to enhance the bonding strength between the above-described two kinds of powders. As the binder for positive electrode, unlike the above-described binder for separator, a binder which produces no or little expansion due to the penetration of the electrolyte is used. As the binder for positive electrode, various binders known in the art including a synthetic resin such as polytetrafluoroethylene and polyethylene are usable. It is also possible to use the binder for separator also as the binder for positive electrode. The content of the conductive material in the powder mixture for positive electrode is generally 3 to 20 wt %. The content of the binder for positive electrode is generally 1 to 20 wt %.

The negative electrode is composed of a powder mixture for negative electrode which includes a negative active material, a conductive material and a binder. Examples of the negative active materials are TiNi, $TiNiB_{0.01}$, $TiNiMm_{0.01}$ (represents misch metal), $LaNi_5$ and TiFe are used. The contents and kinds of the conductive material and the binder for negative electrode are the same as in the case of the positive electrode.

In one aspect, the present invention provides a method for producing a cell which comprises, placing and pre-compressing in a die either one of a powder mixture for positive electrode which contains a positive active material, a conductive material and a binder for positive electrode or a powder mixture for negative electrode which contains a negative active material, a conductive material and a binder for negative electrode, placing and pre-compressing in the die a mixture for separator of an insulating support and a binder which can absorb an electrolyte and can swell in volume, placing and compressing in the die the remaining powder mixture for positive electrode or negative electrode to afford the molded cell element, placing the molded cell element in a container, penetrating an electrolyte in the cell element whereby the separator becomes a larger size than the outer periphery of the positive electrode and/or the negative electrode, and sealing the container.

With reference to FIGS. 2 to 7, a method of producing a coin-shaped cell is explained.

Figure 2:
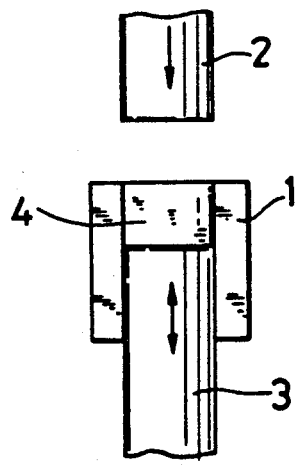
FIGS. 2 to 5 are explanatory views of the manufacturing process for the cell element in accordance with the present invention.

In FIG. 2, the reference numeral 1 represents a molding die, 2 a plunger for compressing the powder charged into the die into a molded product, and 3 a pad of the molding die 1. The pad 3 is vertically movable in the molding die 1 so as to adjust the depth of the molding die 1.

Figure 3:
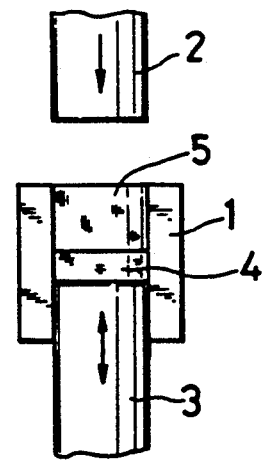
Figure 4:
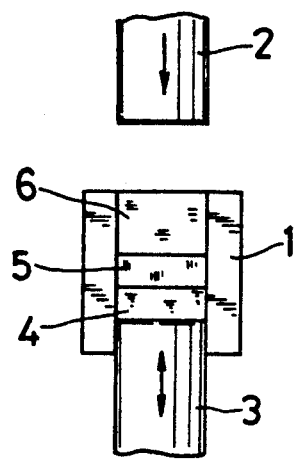
Figure 5:
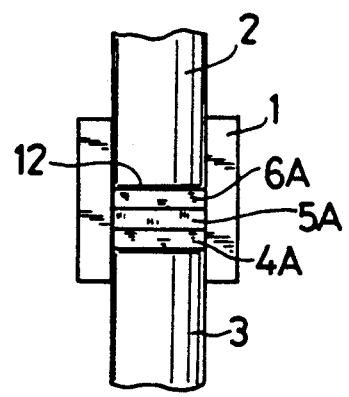

A powder mixture for positive electrode 4 is first charged into the molding die 1, and the powder mixture for positive electrode 4 is lightly pre-compressed by the plunger 2, as shown in FIG. 2. A mixture for separator 5 is then charged onto the pre-compressed material placed in the molding die 1 and is lightly pre-compressed as shown in FIG. 3. Lastly, a powder mixture for negative electrode 6 is charged in the molding die 1, and then sufficiently compressed by the plunger 2 so as to mold into one piece, as shown in FIG. 5.

The order of charging the powder mixtures for positive and negative electrodes into the molding die 1 may be reversed.

Figure 6:
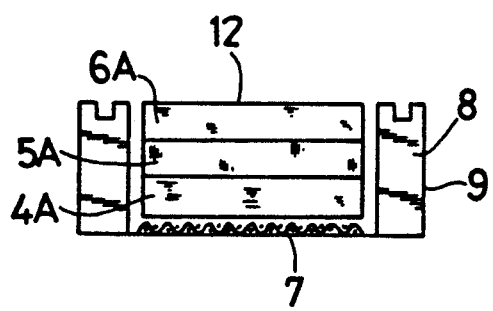
FIGS. 6 and 7 are explanatory views of the manufacturing process for the cell according to the present invention by using the cell element obtained.
Figure 7:
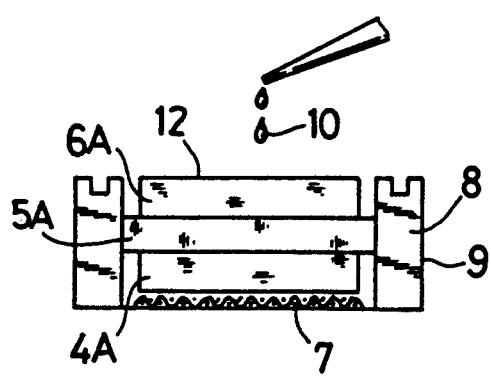

A cell is assembled in the following manner by using the molded product (a tabular three-layered cell element 12) which has been molded in the above-described way and then released from the molding die 1. As shown in FIG. 6, the molded product 12 is placed in a cell container 9 with a gasket 8 mounted thereon and a collector net 7 welded thereto. When an electrolyte 10 composed of, e.g., a known aqueous acid or alkali, is supplied to the cell element 12 so that the electrolyte 10 is penetrated or impregnated at least in the separator 5A which then expands and protrudes generally by 0.3 to 2.5 mm from the outer periphery of the positive electrode 4A and the negative electrode 6A, thereby safely separating the positive electrode 4A and the negative electrode 6A, as shown in FIG. 7. In other words, even if the powder mixture for positive electrode or negative electrode adheres to the inner surface of the molding die 1 during the molding process and the stain having an electron conductive property adheres to the outer periphery of the separator when the molded product is released from the die, thereby causing short circuit between the positive and negative electrodes, the short-circuited portion is safely cut off by the expansion of the separator, thereby preventing the drop of a cell voltage, namely, the reduction in cell capacity.

A cover 11 with a collector net 7 is welded thereto is finally attached to the cell container 9, and the cell container 9 and the cover 11 are caulked for sealing, thereby obtaining a cell of the present invention.

In the case of using a two-layered tablet, a cell can be produced by, for example, placing in the cell container 9 a combination of a molded product obtained by compressing the powder mixture for positive electrode 4 and the mixture for separator 5 by the plunger 2 so as to mold the two mixtures into one unit in the manner shown in FIG. 3 and releasing the molded product from the molding die 1, on one hand, and a molded product obtained by pressure molding the powder mixture for negative electrode 6 by the plunger 2 in the manner shown in FIG. 2 and releasing the molded product from the molding die 1, or an electrode plate such as a sintered negative electrode or a paste negative electrode on the other hand. It is obvious that this case also includes a combination of a two-layered tablet consisting of the powder mixture for negative electrode and the mixture for a separator and a polar electrode.

The present invention will be explained in more detail with reference to the following examples.

EXAMPLE 1

As a powder mixture for positive electrode, 200 mg of a powder mixture of 20 parts by weight of γ-manganese dioxide, 2 parts by weight of acetylene black, 2 parts by weight of graphite, 1 part by weight of carboxymethyl cellulose sodium and 1 part by weight of polytetrafluoroethylene were charged into a cylindrical molding die 15 mm in inner diameter, and pre-compressed by a plunger.

As a mixture for separator, 100 mg of a mixture of 20 parts by weight of an aluminum oxide powder, 5 parts by weight of carboxymethyl cellulose sodium salt and 5 parts by weight of a carboxymethyl cellulose powder were charged onto the mixed powder for a positive electrode in the molding die, and pre-compressed by the plunger. As a powder mixture for a negative electrode, 200 mg of a powder mixture of 10 parts by weight of hydrogenated $TiNiMm_{0.01}$ (Mm represents misch metal), 1 part by weight of acetylene black and 1 part by weight of carboxymethyl cellulose were charged onto the pre-compressed mixture for a separator in the molding die, and compressed by the plunger under a pressure of 200 kg/cm$^2$. In this way, a cell element of a pressure molded product having a three-layer structure was obtained as a content of the cell and released from the molding die.

The outer periphery of the cell element (un-penetrated with an electrolyte) had the same size at the positive electrode, the separator and the negative electrode.

In order to measure the size of the outer periphery of the cell element after the penetration of an electrolyte, 100 μl of an aqueous solution of 30 wt % potassium hydroxide (electrolyte) was added thereto. It was confirmed from the measurement by a test glass that the volume of the separator increased and the separator protruded by 0.75 mm from the outer periphery of the positive electrode and the negative electrode.

The cell element (un-penetrated with an electrolyte) obtained in the same way was inserted into a cell container and 100 μl of an aqueous solution of 30 wt % potassium hydroxide (electrolyte) was added thereto. The container was covered and caulked for sealing. 100 sample cells A were produced in this way and numbered from 1 to 100. When the open-circuit voltages of these sample cells A were measured, they were ranged from 1.10 to 1.15. No defective product which has an open-circuit voltage of less than 1.10 V was found and all the samples were good products, as shown in Table 1.

COMPARATIVE EXAMPLE 1

A cell element was produced in the same way as in Example 1 except that 100 mg of a mixture of 20 parts by weight of an aluminum oxide powder and 1 part by weight of a polytetrafluoroethylene powder was used as the mixture of separator. When the cell element was penetrated with the electrolyte, the separator hardly protruded from the outer periphery of the positive electrode and/or the negative electrode. 100 sample cells B were produced and the open-circuit voltages of these sample cells B were measured in the same way as in Example 1. The defective products include the cells which were judged as a good product immediately after the production but showed drop of voltage after aging. The defective products were as many as 40%.

EXAMPLE 2

10 parts by weight of nickel hydroxide (II), 2 parts by weight of acetylene black and 0.5 part by weight of a polytetrafluoroethylene powder were mixed and pressure molded. The molded product was attached to a nickel substrate and charged in an aqueous solution of 30 wt % potassium hydroxide. The molded product was thereafter removed from the nickel substrate, dried and pulverized. 200 mg of the thus-obtained powder (powder mixture for a positive electrode) was charged into a cylindrical molding die 15 mm in inner diameter and pre-compressed by a plunger.

200 mg of a mixture of 20 parts by weight of an α-alumina powder, 5 parts by weight of carboxymethyl cellulose sodium salt and 5 parts by weight of methyl cellulose were charged onto the mixed powder for a positive electrode in the molding die, and compressed by the plunger. Under a pressure of 200 kg/cm$^2$, thereby obtaining a molded product having a two-layer structure.

As a molded product for negative electrode, 10 mg of a hot melt polyethylene powder was mixed with 200 mg of the powder prepared in the same way as in Example 1, and the resultant mixture were charged into a cylindrical molding die 15 mm in inner diameter and heated to 200° C. while being pre-compressed by the plunger. The mixture was then compressed under a pressure of 100 kg/cm$^2$ to obtain a molded product. The thus-obtained molded product for negative electrode does not expand due to the penetration of an electrolyte.

The two molded products were combined so as to produce a cell and inserted into a cell container. 100 μl of an electrolyte consisting of an aqueous solution of potassium hydroxide was added thereto and the cell container was sealed.

100 sample cells C were produced in this way and numbered from 1 to 100. When the open-circuit voltages of these sample cells C were measured, they were ranged from 1.20 to 1.25 V. No defective product which has an open-circuit voltage of less than 1.20 V was found and all the samples were good products, as shown in Table 1.

EXAMPLE 3

As the mixed powder for a negative electrode, 200 mg of the powder prepared in the same way as in Example 1 were charged into a molding die 15 mm in inner diameter and pre-compressed by a plunger.

As the mixture for separator, 100 mg of the powder prepared in the same way as in Example 2 were charged onto the powder mixture for negative electrode in the molding die and compressed by the plunger under a pressure of 200 kg/cm$^2$ to obtain a molded product having a two-layer structure.

As a molded product for positive electrode, 20 mg of a hot melt polyethylene powder was mixed with 180 mg of the mixture prepared in the same way as in Example 1, and the resultant mixture were charged into a cylindrical molding die 15 mm in inner diameter and heated to 200° C. while being pre-compressed by the plunger. The mixture were then compressed under a pressure of 200 kg/cm² to obtain a molded product. The thus-obtained molded product for positive electrode does not expand due to the penetration of an electrolyte.

The two molded products were combined so as to produce a cell and inserted into a cell container. 100 μl of an electrolyte consisting of an aqueous solution of potassium hydroxide was added thereto and the cell container was sealed.

100 sample cells D were produced in this way and numbered from 1 to 100. When the open-circuit voltages of these sample cells D were measured, they were ranged from 1.10 to 1.15 V. No defective product which has an open-circuit voltage of less than 1.10 V was found and all the samples were good products, as shown in Table 1.

TABLE 1

| Sample No. | Number of the defective Products | | | |
|---|---|---|---|---|
| | Sample cell A | Sample cell B | Sample cell C | Sample cell D |
| 1 to 10 | 0 | 0 | 0 | 0 |
| 11 to 20 | 0 | 1 | 0 | 0 |
| 21 to 30 | 0 | 0 | 0 | 0 |
| 31 to 40 | 0 | 2 | 0 | 0 |
| 41 to 50 | 0 | 4 | 0 | 0 |
| 51 to 60 | 0 | 3 | 0 | 0 |
| 61 to 70 | 0 | 5 | 0 | 0 |
| 71 to 80 | 0 | 8 | 0 | 0 |
| 81 to 90 | 0 | 9 | 0 | 0 |
| 91 to 100 | 0 | 8 | 0 | 0 |

EXAMPLE 4

A cell element is produced in the same manner as in Example 1 except for the use of 2.5 parts by weight of sodium carboxymethyl cellulose and 2.5 parts by weight of carboxymethyl cellulose instead of 5 parts by weight of sodium carboxymethyl cellulose and 5 parts by weight of carboxymethyl cellulose in Example 1.

EXAMPLE 5

A cell element is produced in the same manner as in Example 1 except for the use of 9 parts by weight of sodium carboxymethyl cellulose and 9 parts by weight of carboxymethyl cellulose.

EXAMPLE 6

A cell element is produced in the same manner as in Example 1 except for the use of 4 parts by weight of sodium carboxymethyl cellulose and 4 parts by weight of carboxymethyl cellulose.

EXAMPLE 7

A cell element is produced in the same manner as in Example 1 except for the use of 5 parts by weight of sodium carboxymethyl cellulose.

EXAMPLE 8

A cell element is produced in the same manner as in Example 1 except for the use of 5 parts by weight of carboxymethyl cellulose.

EXAMPLE 9

A cell element is produced in the same manner as in Example 1 except for the use of 5 parts by weight of methyl cellulose.

EXAMPLE 10

A cell element is produced in the same manner as in Example 1 except for the use of 5 parts by weight of polyvinyl alcohol.

EXAMPLE 11

A cell element is produced in the same manner as in Example 1 except for the use of 5 parts by weight of crosslinked polyvinyl alcohol.

EXAMPLE 12

A cell element is produced in the same manner as in Example 1 except for the use of 5 parts by weight of starch.

EXAMPLE 13

A cell element is produced in the same manner as in Example 1 except for the use of 5 parts by weight of starches grafted by acrylic acid.

EXAMPLE 14

A cell element is produced in the same manner as in Example 1 except for the use of 5 parts by weight of starch grafted by methacrylic acid.

EXAMPLE 15

A cell element is produced in the same manner as in Example 1 except for the use of 5 parts by weight of hydrolyzed acrylate-vinyl acetate copolymer.

EXAMPLE 16

A cell element is produced in the same manner as in Example 1 except for the use of 5 parts by weight of hydrolyzed methacrylate-vinyl acetate copolymer.

EXAMPLE 17

A cell element is produced in the same manner as in Example 1 except for the use of 5 parts by weight of crosslinked polyacrylic acid.

EXAMPLE 18

A cell element is produced in the same manner as in Example 1 except for the use of 5 parts by weight of crosslinked polymethacrylic acid.

EXAMPLE 19

A cell element is produced in the same manner as in Example 1 except for the use of 5 parts by weight of agar-agar.

COMPARATIVE EXAMPLE 2

A cell element is produced in the same manner as in Example 1 except for the use of 1 part by weight of carboxymethyl cellulose.

A separator in accordance with the present invention is effective for a cell using a pressure molded product having a two-layer or a three-layer structure consisting of the separator and a positive electrode and/or a negative electrode which are integrally molded as a cell element. Above all, the separator effectively acts on prevention of short circuit especially when a three-layered pressure molded product is used as a cell element.

In other words, even if a stain having an electron conductive property adheres to the outer periphery of the separator due to the contamination of the die during the molding process, which may lead to short circuit between the positive and negative electrodes, the short-circuited portion is safely cut off when the cell element was penetrated with the electrolyte, the separator expands in such a manner as to protrude by 0.3 to 2.5 mm from the outer periphery of the positive electrode and/or the negative electrode, thereby preventing the reduction in cell capacity caused by internal short circuit.

According to the present invention, it is possible to prevent internal short circuit between the positive and negative electrodes of a cell and to provide a cell having high reliability and a method of producing a cell having a high yield and a simple manufacturing process.

What we claimed is:

1. A cell having a cell element which comprises a positive electrode, a negative electrode, a separator sandwiched between the positive and negative electrodes, and an electrolyte wherein the electrodes and the separator are formed from powdered materials which have been compressed, wherein the separator comprises a mixture of an insulating support and a binder which swells upon absorption of the electrolyte so that the separator has a larger outer periphery size than the outer periphery of the positive electrode and/or the negative electrode, and wherein the ratio of the binder to the insulating support in the separator is 1:1 to 1:4 by weight.

2. The cell of claim 1, wherein the separator protrudes by 0.3 to 2.5 mm from the outer periphery of at least the positive electrode or the negative electrode.

3. The cell of claim 1, wherein the binder of the separator is a polymer selected from the group consisting of a methyl cellulose, a carboxymethyl cellulose, an agar-agar, a starch, a starch grafted by acrylic or methacrylic acid, a hydrolyzed acrylate-vinyl acetate copolymer, a hydrolyzed methacrylate-vinyl acetate copolymer, a polyvinyl alcohol, a crosslinked polyvinyl alcohol, a crosslinked polyacrylic acid or a salt thereof, and a crosslinked polymethacrylic acid or salt thereof.

4. The cell of claim 1, wherein the insulating support of the separator is formed from silicon oxide or aluminum oxide.

5. The cell of claim 1, wherein a configuration of said positive and negative electrodes is a thin cylinder of about 5 to 20 mm in diameter.

6. The cell of claim 1, wherein the binder of the separator is nitro cellulose or polyvinyl acetate.

7. The cell of claim 1, wherein the binder of the separator is a methyl cellulose or a carboxymethyl cellulose or carboxmethyl cellulose salt.

8. The cell of claim 1, wherein the ratio of the binder to the insulating support in the separator is 1:2 to 1:4.

9. The cell of claim 1, wherein the ratio of the binder to the insulating support in the separator is 1:2.5 to 1:4.

10. The cell of claim 1, wherein the positive electrode comprises,
    a positive active material selected from the group consisting of manganese dioxide, nickeloxide, tungsten trioxide, lead dioxide, molybdenum trioxide, and mixtures thereof;
    a conductive material selected from the group consisting of acetylene black, graphite, carbon black and nickel powder; and
    a positive electrode binder of polytetrafluoroethylene or polyethylene.

11. The cell of claim 10 wherein the positive active material is manganese dioxide or nickel oxide and the conductive material is acetylene black or graphite.

12. The cell of claim 10, wherein the conductive material is present in an amount of 3 to 20 wt % and the positive electrode binder is present in an amount of 1 to 20 wt %.

13. The cell of claim 1, wherein the negative electrode comprises,
    a negative active material selected from the group consisting of TiNi, $TiNiB_{0.01}$, $TiNiMm_{0.01}$, $LaNi_5$ and TiFe;
    a conductive material selected from the group consisting of acetylene black, graphite, carbon black and nickel powder; and
    a negative electrode binder of polytetrafluoroethylene or polyethylene.

14. The cell of claim 13, wherein the conductive material is acetylene black or graphite.

15. The cell of claim 13, wherein the conductive material is present in an amount of 3 to 20 wt% and the negative electrode binder is present in an amount of 1 to 20 wt %.

16. The cell of claim 1, wherein the cell element is disposed within a cell gasket and a cover having a collector net is disposed over each of the positive and negative electrodes.

* * * * *